United States Patent
Kumhyr et al.

(10) Patent No.: US 7,231,611 B2
(45) Date of Patent: Jun. 12, 2007

(54) APPARATUS AND METHOD FOR DYNAMICALLY BUILDING A CONTEXT SENSITIVE COMPOSITE ICON

(75) Inventors: David Bruce Kumhyr, Austin, TX (US); Margaret Gardner MacPhail, Corpus Christi, TX (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 10/324,361

(22) Filed: Dec. 18, 2002

(65) Prior Publication Data

US 2004/0119756 A1 Jun. 24, 2004

(51) Int. Cl.
*G06F 3/00* (2006.01)
*G06F 3/33* (2006.01)

(52) U.S. Cl. ...................... 715/837; 715/837
(58) Field of Classification Search ................ 715/837, 715/967, 835; 345/837
See application file for complete search history.

(56) References Cited

U.S. PATENT DOCUMENTS

| | | | |
|---|---|---|---|
| 5,367,626 A | | 11/1994 | Morioka et al. |
| 5,452,414 A | * | 9/1995 | Rosendahl et al. ......... 715/836 |
| 5,479,602 A | * | 12/1995 | Baecker et al. ............ 715/838 |
| 5,490,245 A | | 2/1996 | Wugofski .................. 395/159 |
| 5,506,952 A | * | 4/1996 | Choy et al. ................ 715/763 |
| 5,546,525 A | | 8/1996 | Wolf et al. ................. 395/159 |
| 5,623,592 A | | 4/1997 | Carlson et al. ............. 395/348 |
| 5,668,961 A | | 9/1997 | Healy et al. ................ 345/339 |
| 5,692,145 A | * | 11/1997 | Nakanishi .................. 715/775 |
| 5,727,174 A | * | 3/1998 | Aparicio et al. ............ 715/837 |

(Continued)

FOREIGN PATENT DOCUMENTS

JP 04319726 9/1992

(Continued)

OTHER PUBLICATIONS

Friedell et al., "Context-Sensitive, Graphic Presentation of Information", Computer Graphics, vol. 16, No. 3, Jul. 1982, pp. 181-188.

(Continued)

*Primary Examiner*—Ba Huynh
*Assistant Examiner*—David Phantana-angkool
(74) *Attorney, Agent, or Firm*—Duke W. Yee; Jeffrey S. LaBaw; Rakesh Garg

(57) ABSTRACT

A method and apparatus for dynamically building a context sensitive composite icon are provided. A base icon is used to represent a particular object in a graphical user interface. This base icon has addition points where icon additions may be attached to the base icon, such as through an icon overlay process. By adding icon additions at the addition points of the base icon, a composite icon is generated and then registered with the graphical user interface. The icon additions that are used to generate the composite icon are selected based on a particular context in which the object associated with the base icon is being used. The use of icon additions with the base icon is determined dynamically as the context of the corresponding object changes. In this way, the same base icon may be used to represent a particular object with additions to the base icon being used to provide additional information that is important to the current context of the corresponding object.

21 Claims, 7 Drawing Sheets

U.S. PATENT DOCUMENTS

| | | | | |
|---|---|---|---|---|
| 5,802,383 | A | * | 9/1998 | Li et al. .................... 345/420 |
| 5,821,927 | A | * | 10/1998 | Gong ........................ 715/822 |
| 5,838,317 | A | * | 11/1998 | Bolnick et al. ............ 715/764 |
| 5,838,326 | A | * | 11/1998 | Card et al. ................. 715/775 |
| 5,930,154 | A | | 7/1999 | Thalhammer-Reyero .... 364/578 |
| 5,966,126 | A | | 10/1999 | Szabo ....................... 345/348 |
| 5,980,096 | A | * | 11/1999 | Thalhammer-Reyero .... 707/100 |
| 6,031,532 | A | | 2/2000 | Gourdol et al. ............ 345/348 |
| 6,091,416 | A | | 7/2000 | Cragun ..................... 345/348 |
| 6,100,888 | A | * | 8/2000 | Gourdol et al. ............ 715/837 |
| 6,259,428 | B1 | * | 7/2001 | Ramchandani et al. ..... 345/589 |
| 6,278,455 | B1 | * | 8/2001 | Baker ....................... 715/716 |
| 6,304,855 | B1 | | 10/2001 | Burke |
| 6,366,300 | B1 | * | 4/2002 | Ohara et al. ............... 715/771 |
| 6,469,722 | B1 | * | 10/2002 | Kinoe et al. ............... 715/837 |
| 6,469,723 | B1 | * | 10/2002 | Gould et al. ............... 715/837 |
| 6,532,048 | B1 | * | 3/2003 | Matsui ...................... 349/96 |
| 6,535,888 | B1 | | 3/2003 | Vijayan et al. |
| 6,639,614 | B1 | * | 10/2003 | Kosslyn et al. ............ 715/837 |
| 6,857,106 | B1 | * | 2/2005 | Brouaux .................... 715/837 |
| 2002/0051017 | A1 | | 5/2002 | Wishoff |
| 2002/0091739 | A1 | * | 7/2002 | Ferlitsch et al. ............ 707/526 |
| 2003/0132938 | A1 | * | 7/2003 | Shibao ...................... 345/473 |

FOREIGN PATENT DOCUMENTS

WO    WO0133423    5/2001

OTHER PUBLICATIONS

Herschmann, "The Effects of Practical Business Contraints on User Interface Design", Jun. 24, 2002, file://C:\Program%20Files\p531-herschmann.htm, pp. 1-7.

Levialdi et al., "The Interface of the Future", ACM Digital Library, 1994, pp. 200-205.

Technical Patent 108601, "Dynamic Generation and Temporary Display of Icons", WPIL, 1986, one page.

Furmanski et al., "A Compact Language for Real-Time Graphics", ACM Digital Library, 1988, pp. 749-759.

Cha et al., "Browsing Multimedia Objects via Composite Icons", IEEE Online Library, 1995, pp. 3926-3931.

* cited by examiner

APPARATUS AND METHOD FOR DYNAMICALLY BUILDING A CONTEXT SENSITIVE COMPOSITE ICON

BACKGROUND OF THE INVENTION

1. Technical Field

The present invention is directed to a method and apparatus for dynamically building a context sensitive composite icon. More specifically, the present invention provides a mechanism for dynamically displaying information in the form of a base icon and icon additions based on data associated with the base icon and a context in which the icon is being used.

2. Description of Related Art

Icons are small, pictorial, on-screen representation of an object, such as a document, program, folder, disk drive, or the like, in a graphical user interface (GUI). Icons generally resemble some aspect of the object that they represent. In this way, the icon provides a minimal amount of information regarding the object with which it is associated.

FIG. 1 illustrates some exemplary known icons used in a Microsoft Windows™ operating environment. As shown in FIG. 1, the icon 110 is associated with the application used for setting and obtaining information about the network properties of the computer. The icon 110 represents two computers connected via a cable and thus, the graphical depiction provides information identifying the object with which it is associated. Similarly, the icon 120 is associated with an inbox application and graphically represents a physical inbox that would be present on a person's desk. Likewise, the icon 130 is associated with a recycling program and graphically represents a physical recycling trash can.

Typically, icon representations are defined long before they are used. That is, an application developer will define static icons that may be used to represent the object. The range of expression for an icon is limited with some being completely constant and some changing within a fixed set of representations. In other words, icons typically do not change or may be switched with other static replacement icons to give the impression that the icon has changed.

For example, the recycle bin icon 130 discussed above may have a first icon that graphically depicts an empty recycling bin when there are no files designated for recycling. When one or more files have been designated for recycling, however, the icon 130 may be switched to another static icon representing a full recycling bin, such as that depicted in FIG. 1.

Also, in order to provide entertainment value, animated icons are known to be used in which a series of static icons are quickly switched to give the illusion of movement within the icon. Such animated icons are available, for example, in Microsoft Windows Plus!™ and Icon Hear-It 98™, available from Moon Valley Software.

In addition, icon overlays, which are small images placed at the lower-left corner of the icon and represent a Shell object, are generally known in the art and are used to provide extra information regarding the object with which the icon is associated. For example, a commonly used icon overlay is the small arrow 150 that indicates that the icon represents a link, rather than the actual file or folder. In addition to the standard icon overlays, an application developer can generate custom icon overlays for specified Shell objects by implementing and registering an icon overlay handler. Information regarding icon overlays, some of which is reproduced herein below, may be obtained from Microsoft Corporation and the Microsoft Developer Network website.

Icon overlay handlers are Component Object Model (COM) objects that are associated with a particular icon overlay. All communication between the Shell and the handler takes place through the handler's IShellIconOverlayIdentifier interface. When the Shell starts up, it initializes all icon overlay handlers by calling two of their IShellIconOverlayIdentifier methods:

(1) the Shell calls GetOverlayInfo to request the location of the handler's icon overlay. The icon overlay handler returns the name of the file containing the overlay image, and its index within that file. The Shell then adds the icon overlay to the system image list; and (2) the Shell calls GetPriority to determine the icon overlay's priority. The priority value is a number from zero to 100, with 100 indicating the lowest priority. If more than one icon overlay is requested for a particular file, the Shell uses this value to help it determine which icon overlay to display.

Before painting an object's icon, the Shell passes the object's name to each icon overlay handler's IsMemberOf method. An icon overlay handler is normally associated with a particular group of files. For example, the icon overlay handler might request an overlay for all members of a file class, such as all files with an .myp file name extension. If a handler wants to have its icon overlay displayed, it returns S_OK. The Shell then calls the handler's GetOverlayInfo method to determine which icon to display.

It should be noted that once the image has been loaded into the system image list during initialization, it cannot be changed. After initialization, the file name and index are used only to identify the icon overlay. The system will not load a new icon overlay. When GetOverlayInfo is called, the handler must return the same file name and index that was specified when the function was first called.

Although only one icon overlay can be displayed, it is possible for an object to have icon overlays requested by more than one handler. In that case, the Shell resolves the conflict by displaying the highest priority icon overlay. The Shell resolves many such conflicts with an internal set of rules. If these rules are not sufficient, the Shell compares the priority values that were specified by the handlers' GetPriority method during initialization.

Thus, while icon overlays may be used in known systems to provide additional information about a shell object, these icon overlays are limited in that only a single icon overlay may be displayed, the icon overlay is limited to a single position on the original icon, and the icon overlay is fixed once the icon image has been loaded into the system image list. Furthermore, such icon overlays do not provide any information regarding the context in which the icon is being used. Rather, they merely provide a fixed representation of a shell object.

Thus, it would be beneficial to have an improved method and apparatus for dynamically building a context sensitive composite icon that is changeable based on the context in which the icon is used.

SUMMARY OF THE INVENTION

The present invention provides a method and apparatus for dynamically building a context sensitive composite icon. With the present invention, a base icon is used to represent a particular object in a graphical user interface. This base icon has addition points where icon additions may be attached to the base icon, such as through an icon overlay process. By adding icon additions at the addition points of the base icon, a composite icon is generated and then registered with the graphical user interface.

The icon additions that are used to generate the composite icon are selected based on a particular context in which the object associated with the base icon is being used. By "context" what is meant is the current status or condition of the object taking into account the particular manner in which the object is being used. In preferred embodiments, the context is closely related to the other objects, applications and functions with which the object is being used. Based on the context of the object, its associated base icon is augmented with icon additions appropriate for the context.

The use of icon additions with the base icon is determined dynamically as the context of the corresponding object changes. Thus, for example, if the base icon for the object is selected and dragged over top another base icon associated with another object, thereby instructing that the two objects are to operate together, the context of the objects have changed and thus, one or both of their base icons will be dynamically modified using one or more icon additions determined from context information associated with the objects. In this way, the same base icon may be used to represent a particular object with additions to the base icon being used to provide additional information that is important to the current context of the corresponding object.

These and other feature and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
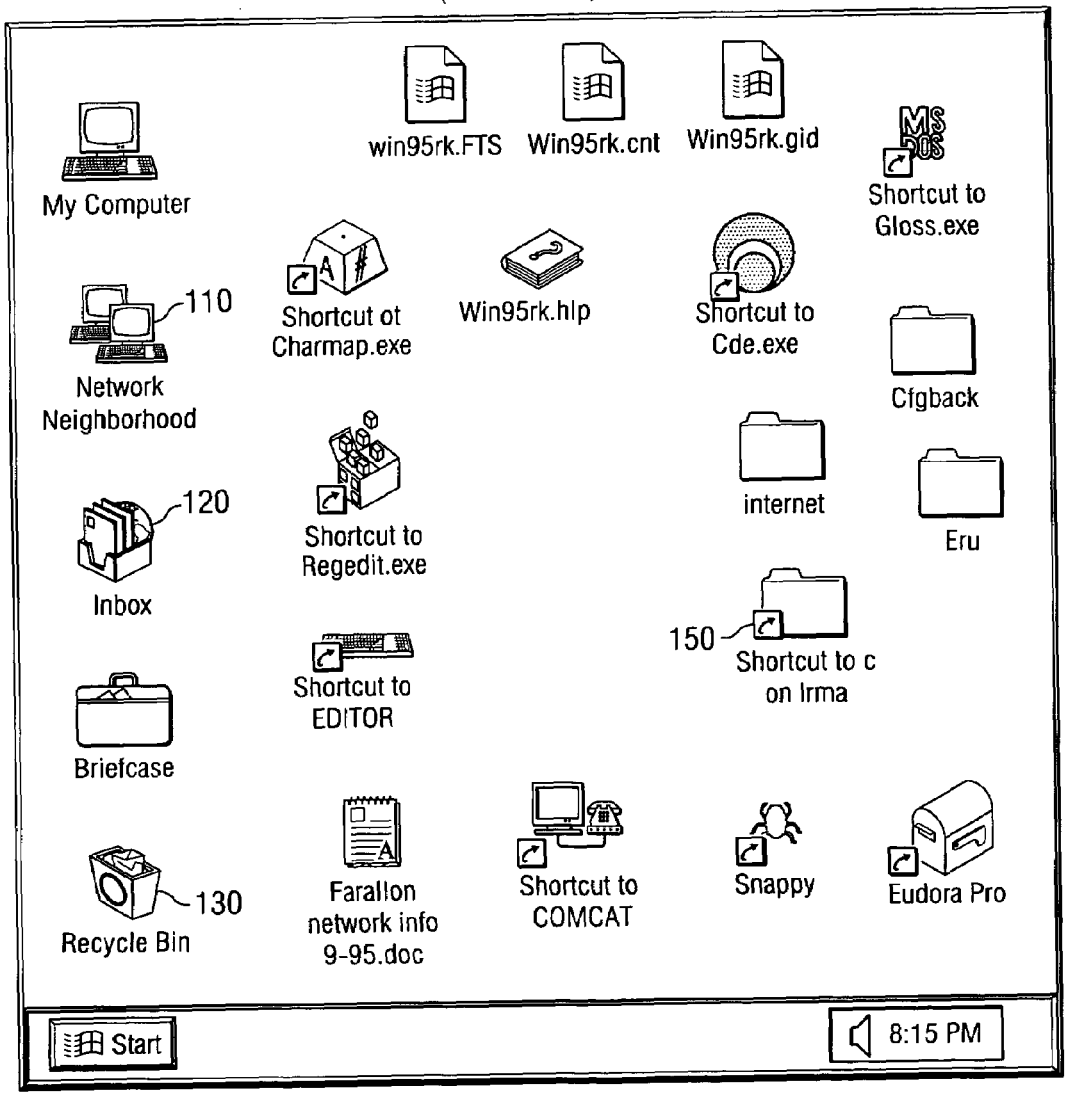
FIG. 1 is an exemplary diagram of known icons in a graphical user interface.
Figure 2:
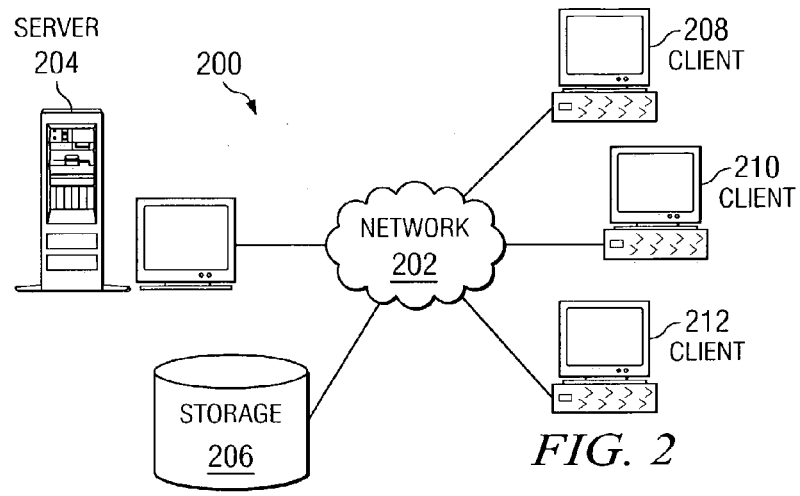
FIG. 2 is an exemplary diagram of a distributed data processing system in which the present invention may be implemented.
Figure 3:
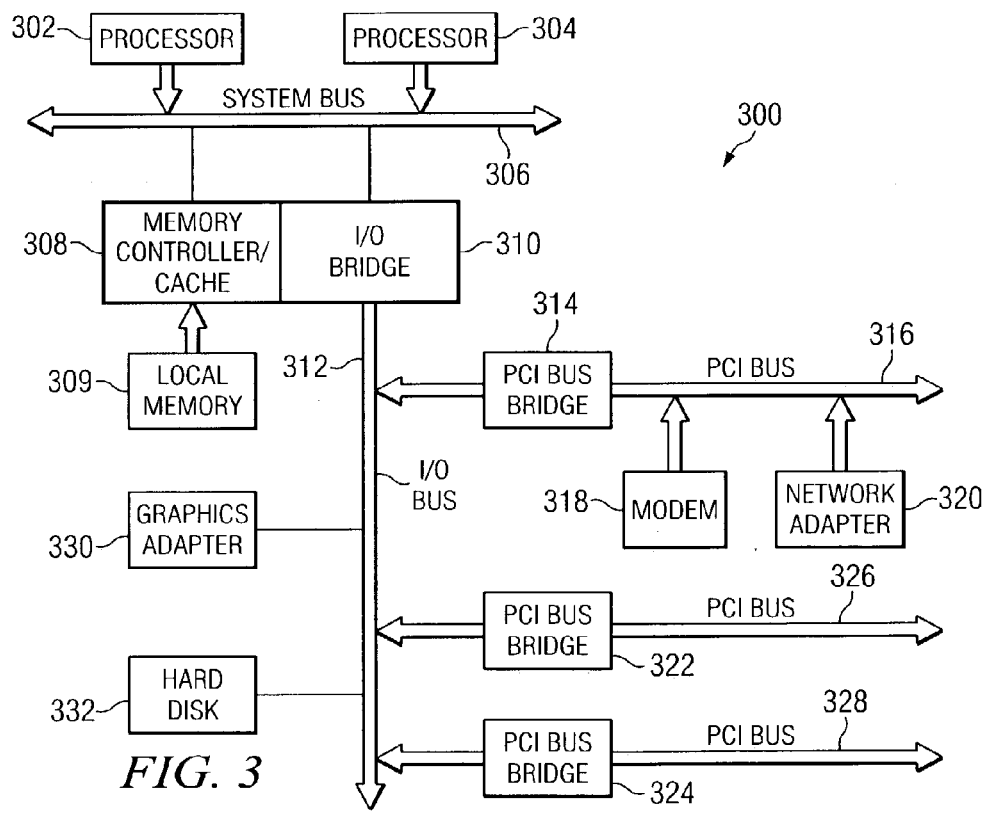
FIG. 3 is an exemplary block diagram of a server computing device in accordance with the present invention.
Figure 4:
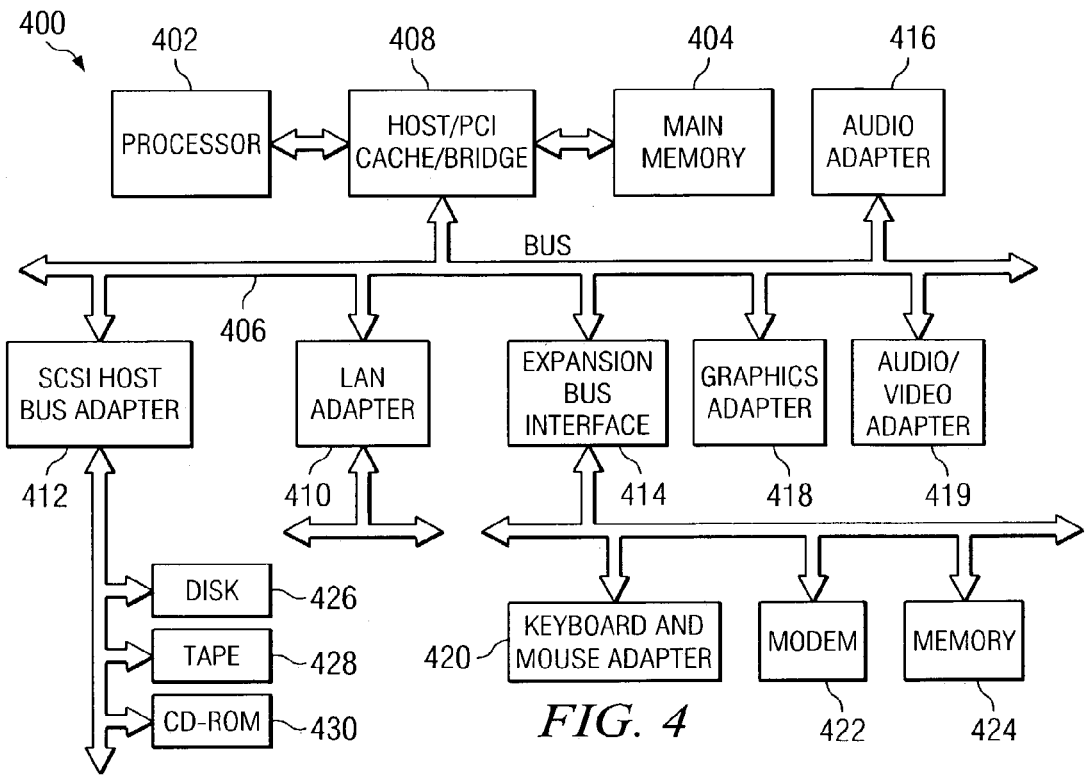
FIG. 4 is an exemplary block diagram of a client computing device in accordance with the present invention.

The present invention provides a mechanism for dynamically building context sensitive composite icons. The preferred embodiments of the present invention may be implemented in a stand alone computing device and/or a distributed data processing environment. As such, FIGS. 2–4 are provided hereafter as exemplary of the environment and hardware devices in which the present invention may be implemented. It should be appreciated that in a stand alone computing device, the present invention may be implemented in a computing device such as that shown in FIG. 4 without requiring interaction with a server computing device or network.

With reference now to the figures, FIG. 2 depicts a pictorial representation of a network of data processing systems in which the present invention may be implemented. Network data processing system 200 is a network of computers in which the present invention may be implemented. Network data processing system 200 contains a network 202, which is the medium used to provide communications links between various devices and computers connected together within network data processing system 200. Network 202 may include connections, such as wire, wireless communication links, or fiber optic cables.

In the depicted example, server 204 is connected to network 202 along with storage unit 206. In addition, clients 208, 210, and 212 are connected to network 202. These clients 208, 210, and 212 may be, for example, personal computers or network computers. In the depicted example, server 204 provides data, such as boot files, operating system images, and applications to clients 208–212. Clients 208, 210, and 212 are clients to server 204. Network data processing system 200 may include additional servers, clients, and-other devices not shown.

In the depicted example, network data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 200 also may be implemented as a number of different types of networks, such as for example, an intranet, a local area network (LAN), or a wide area network (WAN). FIG. 2 is intended as an example, and not as an architectural limitation for the present invention.

Referring to FIG. 3, a block diagram of a data processing system that may be implemented as a server, such as server 204 in FIG. 2, is depicted in accordance with a preferred embodiment of the present invention. Data processing system 300 may be a symmetric multiprocessor (SMP) system including a plurality of processors 302 and 304 connected to system bus 306. Alternatively, a single processor system may be employed.

Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to clients 208–212 in FIG. 2 may be provided through modem 318 and network adapter 320 connected to PCI local bus 316 through add-in boards. Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y, running the Advanced Interactive Executive (AIX) operating system or LINUX operating system.

With reference now to FIG. 4, a block diagram illustrating a data processing system is depicted in which the present invention may be implemented. Data processing system 400 is an example of a client computer. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used.

Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. Small computer system interface (SCSI) host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation. An object oriented programming system such as Java may run in conjunction with the operating system and provide calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system.

As another example, data processing system 400 may be a stand-alone system configured to be bootable without relying on some type of network communication interfaces As a further example, data processing system 400 may be a personal digital assistant (PDA) device, which is configured with ROM and/or flash ROM in order to provide nonvolatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

As mentioned previously, the present invention provides a mechanism for dynamically building a context sensitive composite icon. With the present invention, a base icon is used to represent a particular object in a graphical user interface. This base icon has addition points where icon additions may be attached to the base icon, such as through an icon overlay process. By adding icon additions at the addition points of the base icon, a composite icon is generated and then registered with the graphical user interface. The icon additions that are used to generate the composite icon are dynamically selected based on a particular context in which the object associated with the base icon is being used.

Figure 5:
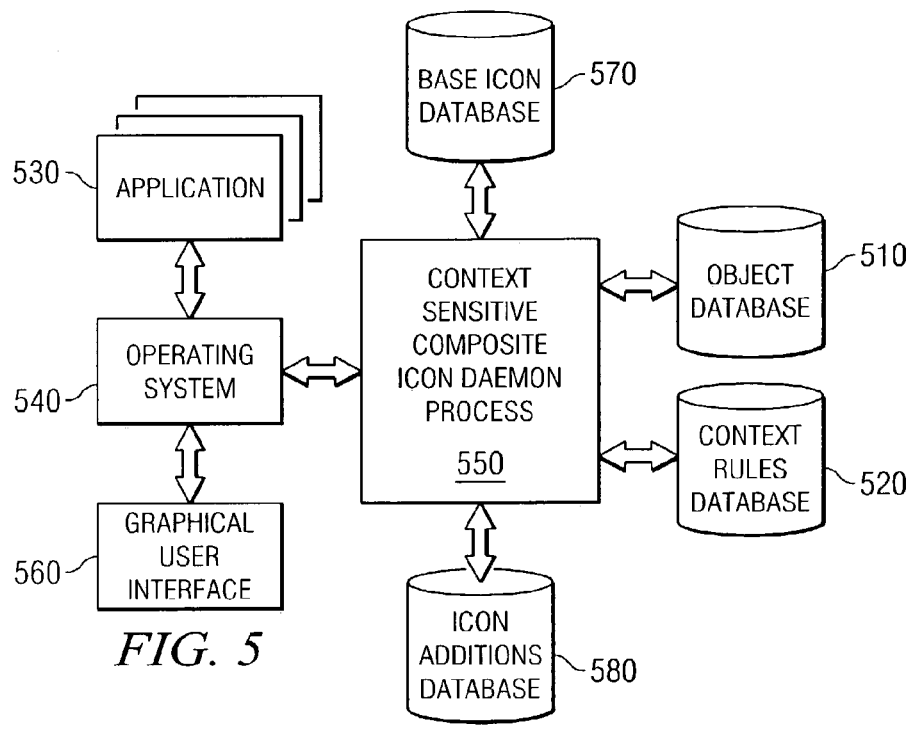
FIG. 5 is an exemplary diagram illustrating the interaction of the primary elements of the present invention to dynamically build a context sensitive composite icon.

FIG. 5 is an exemplary diagram illustrating the interaction of the primary elements of the present invention to dynamically build a context sensitive composite icon. As shown in FIG. 5, an object database 510 and context rules database 520 are provided for storing data that is used by a context sensitive composite icon daemon process 550. The context sensitive composite icon daemon process 550 operates in the background of the graphical user interface 560 such that the functions it performs are not readily discernible by the user of the graphical user interface 560.

The context sensitive composite icon daemon process 550 is responsible for dynamically generating composite icons, in accordance with the present invention, based on the context of the objects associated with the icons. The context sensitive composite icon daemon process 550 (hereafter referred to as the daemon process 550), listens for events from the graphical user interface 560 and applications 530. The operating system 540 is provided with event handlers and event notification mechanisms as is known in the art. The daemon process 550 registers with these event handlers and notification mechanisms as a listener of events and thus, when the graphical user interface 560 or the applications 530 generate events that are of interest to the daemon process 550, the daemon process 550 is notified and provided with the necessary information to perform the tasks of the present invention.

The events represent operations being performed on objects stored in the object database 510. The events include information identifying the particular objects of object database 510 involved in the event, the particular application, the functions being performed, and the like.

For example, an event may be the selection of an icon using the graphical user interface (GUI) 560, dragging a selected icon over top another icon in the GUI 560, initialization of an application 530, performing a function in an application 530, creation of a new object in the object database 510, and the like. The number of possible events that may be handled by the present invention precludes the mentioning of each herein. Those of ordinary skill in the art, however, will understand the scope of events that may be used with the present invention in view of the present description of the exemplary embodiments.

Based on the event notification received, the daemon process 550 retrieves information regarding the objects from the object database 510 that are involved in the event. In addition, from the information stored in the event notification, e.g., name of the application issuing the event notification, the function being performed, the particular objects involved, etc. a context of the objects is determined. For example, from the event notification, a determination may be made that an object representing a patient is being added to a patient monitoring application 530.

Based on this determination, context rules for that particular application 530 are retrieved from the context rules database 520 and applied to the objects retrieved from object database 510. By applying the context rules to the object, it can be determined which icon additions are to be displayed with the base icon representing the object for representing the object in the particular context.

For example, in the example given above, if the application is a patient monitoring application, the relevant information associated with the object that is of importance in such a context is the type of injury or ailment of the patient, the current status of the patient, the name of the patient, and the present location of the patient. The context rules for such an example may be of the type: retrieve patient name, retrieve patient ailment, retrieve current status, retrieve present location, if injury is "cardiac" display icon addition "heart" at addition point 1, if injury is "car accident" display icon addition "car" at addition point 1, etc.

Thus, the context determination information obtained from the event is used to select a set of rules for the particular context. The context rules determine what information to extract from the object associated with the base icon for the particular context, what icon addition to display with the base icon based on the information extracted from the object, and where to display the icon addition.

Once it is determined which icon additions are to be displayed with the base icon based on the current context of the object and where on the base icon the additions are to be placed, the daemon process 550 retrieves the information for the base icon from the base icon database 570 and information for the icon additions from the icon additions database 580. The daemon process 550 then generates a composite icon data file representing the composite of the base icon and the icon additions placed at the designated additions points of the base icon. The daemon process 550 then registers the composite icon with the operating system 540 which causes the composite icon to be displayed, or "painted", in the graphical user interface 560.

The base icon database 570 and icon additions database 580 may be associated with the operating system 540, the graphical user interface 560, or one or more of the applications 530. For example, the base icon database 570 may be associated with the graphical user interface 560 while the icon additions database 580 is specifically designed and associated with a particular one of the applications 530. Alternatively, a standardized database of base icons and icon additions may be stored in a local or remote location with base icons and icon additions being retrieved on an as needed basis. Of course, other mechanisms for storing the base icons and icon additions may be used without departing from the present invention so long as they are accessible by the context sensitive composite icon daemon process 550.

Thus, through event notification, the daemon process 550 is dynamically informed of changes to context of objects in the object database 510. Based on this dynamic notification of context changes, the daemon process 510 retrieves rules 520 and applies them to generate a context sensitive composite icon that is a composite of the base icon for the object and icon additions selected based on the context and the particular attributes of the object.

Figure 6:
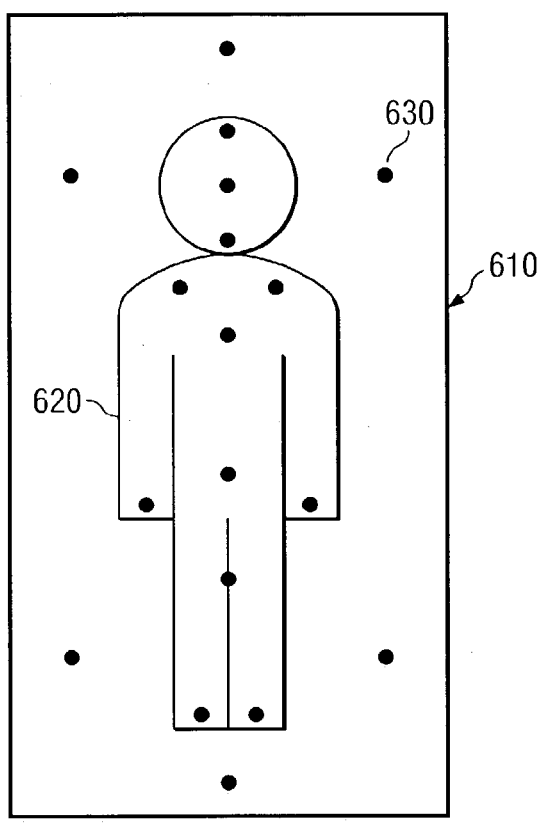
FIG. 6 is an exemplary diagram illustrating a base icon with addition points in accordance with the present invention.

FIG. 6 is an exemplary diagram illustrating a base icon with addition points in accordance with the present invention. As shown in FIG. 6, the graphical depiction 620 of icon 610 represents a male person. The dark dots 630 on the icon 610 represent addition points where icon additions may be placed based on the context of the object associated with the icon 610. While these addition points 630 are shown as dark visible dots in FIG. 6, in actuality when the icon 610 is displayed in a GUI, such as GUI 560, the addition points are not visible. The addition points 630 only exist in terms of the data representation of the icon 610.

In a preferred embodiment, the addition points 630 are placed at standardized positions of the icon 610. That is, the addition points 630 are at the same position in each of icon of the type shown in FIG. 6 regardless of the particular source of the icon. In this way, icons from different sources may be used with the same set of icon additions without having compatibility problems when creating the composite icons.

The base icon 610 is an icon that may be used to represent the same object in a number of different contexts. In this way, there is a uniformity of representation of the object in each context that allows a user to develop a recognition of the icon as being associated with a particular object. For example, a user may generate an object that represents himself, e.g., by using an application to enter information about himself, and then select a base icon to represent the object he created. This is typically done when a user registers with a communications application, such as a newsgroup, chat room, etc. Since this base icon will retain much of its characteristics regardless of what context it is used in, the user will be able to immediately recognize the icon as representing "himself," i.e. the object created to store the data about the user.

However, the base icon 610 of the present invention is provided with addition points 620 which may be used to add icon additions to display additional information about the object based on the particular context. For example, if the user has a particular role in a certain newsgroup, has been a member of the newsgroup for a period of time, etc., icon additions representing this information may be selected for display at addition points in the base icon when the object representing the user is used with the newsgroup application. For example, a background of the base icon may be changed to represent a particular newsgroup, a beard may be added to the icon representing the user to designate that the user has been part of the newsgroup for a long period of time, and a hat may be added to the base icon to represent that the user has a particular role in the newsgroup. Thus, even though the composite icon will retain much of the base icon 610 for recognition purposes, additional information about the object associated with the base icon 610, that is pertinent to the present context, is displayed through the use of the addition points and icon additions.

Figure 7:
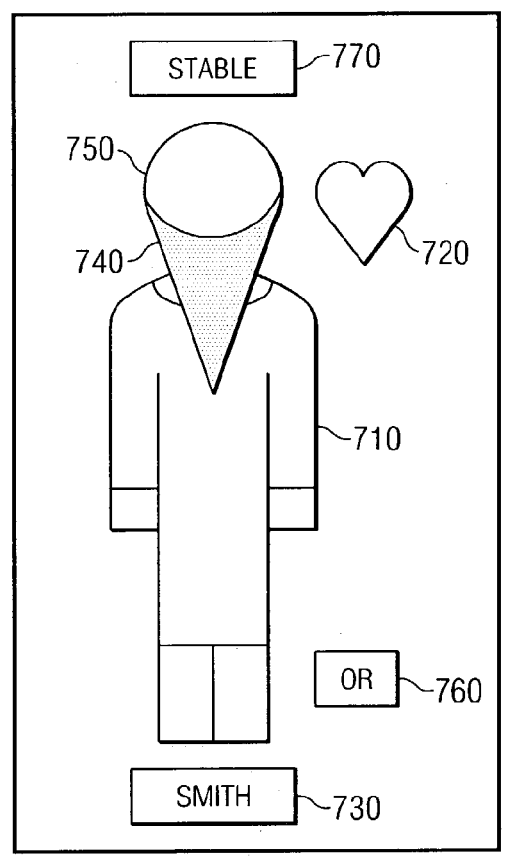
FIG. 7 is an exemplary diagram illustrating a base icon with icon additions added to the base icon based on a context in which the icon is being used.

FIG. 7 is an exemplary diagram illustrating a base icon with icon additions added to the base icon based on a context in which the icon is being used. In the particular example shown in FIG. 7, the object associated with the base icon 610 in FIG. 6 has been used with an application for monitoring patient status. As a result, the information obtained from the object pertains to the status of the patient represented by the object. Likewise, the particular graphical icon additions selected based on this patient status information extracted from the object are selected from a set of graphical icon additions representing patient status attributes.

For example, assume that the object associated with icon 610 represents a male person, Mr. Smith. The object may have the following list of attributes:

Last Name—Smith
Type—Patient
Gender—Male
Age—69
Ailment—Cardiac
Current Location—Operating Room
Current Condition—Stable Upon the creation of the object for Mr. Smith in a computing system, the daemon process of the present invention may generate the base icon shown in FIG. 6. This base icon may be generated based on the fact that Mr. Smith is male and thus, a male base icon is selected to represent Mr. Smith. Additions to this base icon are then selected based on the fact that the object is to be used with the patient status monitoring application.

As a result that the object is being used with the patient status monitoring application, which may be determined based on an event such as refreshing the patient status monitoring application or updating it at predetermined selected times, a set of context rules is retrieved from a context rules database for the patient status monitoring application. These context rules are then applied to the object representing Mr. Smith to thereby extract the above attribute information from the object and use it with the context rules to determine how to represent the icon for Mr. Smith in the graphical user interface associated with the patient monitoring application.

FIG. 7 illustrates the results of applying the context rules to the attribute information extracted from the object representing Mr. Smith. As shown in FIG. 7, based on the fact that Mr. Smith's type is "patient" a patient robe icon addition is added to addition points over male body graphic 750 in the base icon 610. In a color representation of the icon, this patient robe may be green in color to resemble actual patient robes often found in hospital environments.

A heart icon addition 720 is added to the icon 610 in order to indicate that Mr. Smith is a cardiac patient. A banner icon addition 730 with the text "Smith" is added to represent Mr. Smith's last name in the composite icon. A beard icon addition 740 is added to the body graphic 750 to represent the age of Mr. Smith. A banner icon addition 760 is added to indicate the current location of Mr. Smith being in the operating room, or "OR". Lastly, a banner icon addition 770 is added with the text "Stable" to indicate Mr. Smith's current condition. The result of the base icon and the icon additions shown in FIG. 7 is then stored as a composite icon which is registered with the operating system for use with the patient status monitoring application. The composite icon may then be displayed and may be selectable for use in the patient status monitoring application.

The addition of the icon additions to the base icon at the addition points may be performed by superimposing the icon additions on the base icon. Such superimposing may be performed using an icon overlay approach, such as is known in the art, which is modified to be able to overlay the icon additions of the present invention at various established addition points on the base icon. Alternatively, graphical elements of the base icon may be directly modified to thereby "insert" the icon additions into the base icon to generate a composite icon.

Moreover, bit masking across the image may be used to add icon additions to the base icon at the addition points. Bit masking is generally known in the art but has not been used with regard to a composite icon such as that taught in the present invention.

In the happenstance that two or more icon additions are to be added at the same addition point, a priority mechanism similar to that discussed above with regard to icon overlays may be used to determine which icon addition to add to the base icon. Alternatively, other alternate addition points may be selected for adding icon additions that would otherwise be added to the same addition point in the base icon.

In yet other embodiments of the present invention, if a conflict arises between icon additions, the conflict itself may be used as a way to notify a user of an error or potentially dangerous condition. For example, if the base icon is an airplane and two icon additions are attempting to be added to the base icon that conflict with one another, the conflict may be used as a mechanism for notifying the pilot or other user of a potentially dangerous condition. That is, if one icon addition is an addition to indicate that the flaps are being deployed and the second icon addition is an addition to indication that the flaps are being retracted, these two icon additions conflict with one another and could cause a potential problem with operation of the aircraft. Upon detection of the conflicting icon additions, a notification may be made to the user indicating the conflict and allowing the user to determine how to solve the conflict, such as by taking over manual control of the aircraft.

In another example, using the hospital patient examples discussed previously, if an icon addition illustrates that medications have been provided to the patient and another icon addition is attempted to be added to the composite icon indicating that medications have been administered, the attempt to add another icon addition is an indication that the patient may have received a double dose of medication. Based on this conflict, a notification may be provided to hospital personnel in order to let them take appropriate measures to assure the health of the patient.

It should be appreciated that the same base icon shown in FIG. 6 may be used with many different applications and many different contexts. Thus, while FIG. 7 illustrates one possible composite icon generated from the base icon, in other contexts the composite icon will look different. For example, if the same base icon is used in a newsgroup application, the corresponding composite icon will not include icon additions representing current patient status. Rather, the composite icon will have icon additions added to addition points of the base icon that are appropriate for the newsgroup application.

Figure 8:
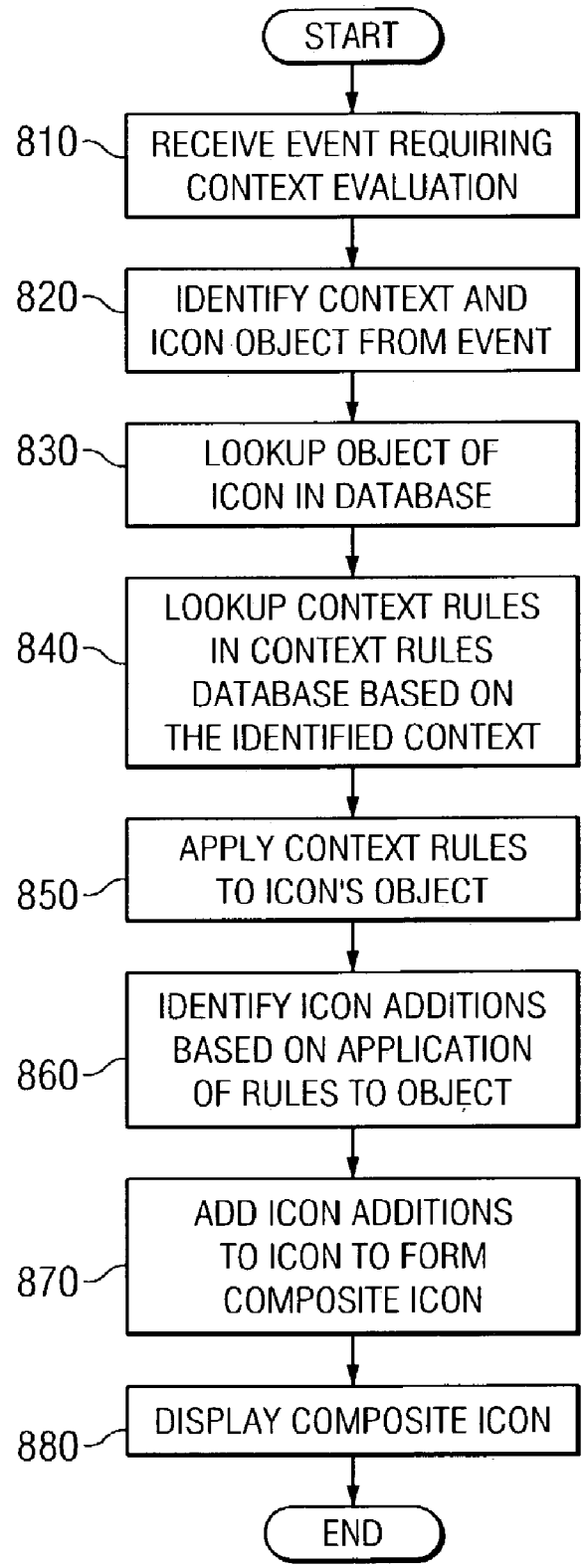
FIG. 8 is a flowchart outlining an exemplary operation of the present invention.

FIG. 8 is a flowchart outlining an exemplary operation of the present invention. As shown in FIG. 8, the operation starts with receiving an event requiring context evaluation for one or more objects of a computing system (step 810). The context and icon object are identified from information obtained from the event (step 820). The object of the base icon is looked up in the object database (step 830) and the context rules in the context rules database are retrieved (step 840). The context rules are then applied to the icon's object (step 850). Icon additions are then identified based on the application of the context rules to the object (step 860) and the icon additions are added to the addition points of the base icon to form a composite icon (step 870). The composite icon is then displayed (step 880) and may be used in the graphical user interface.

Figure 9:
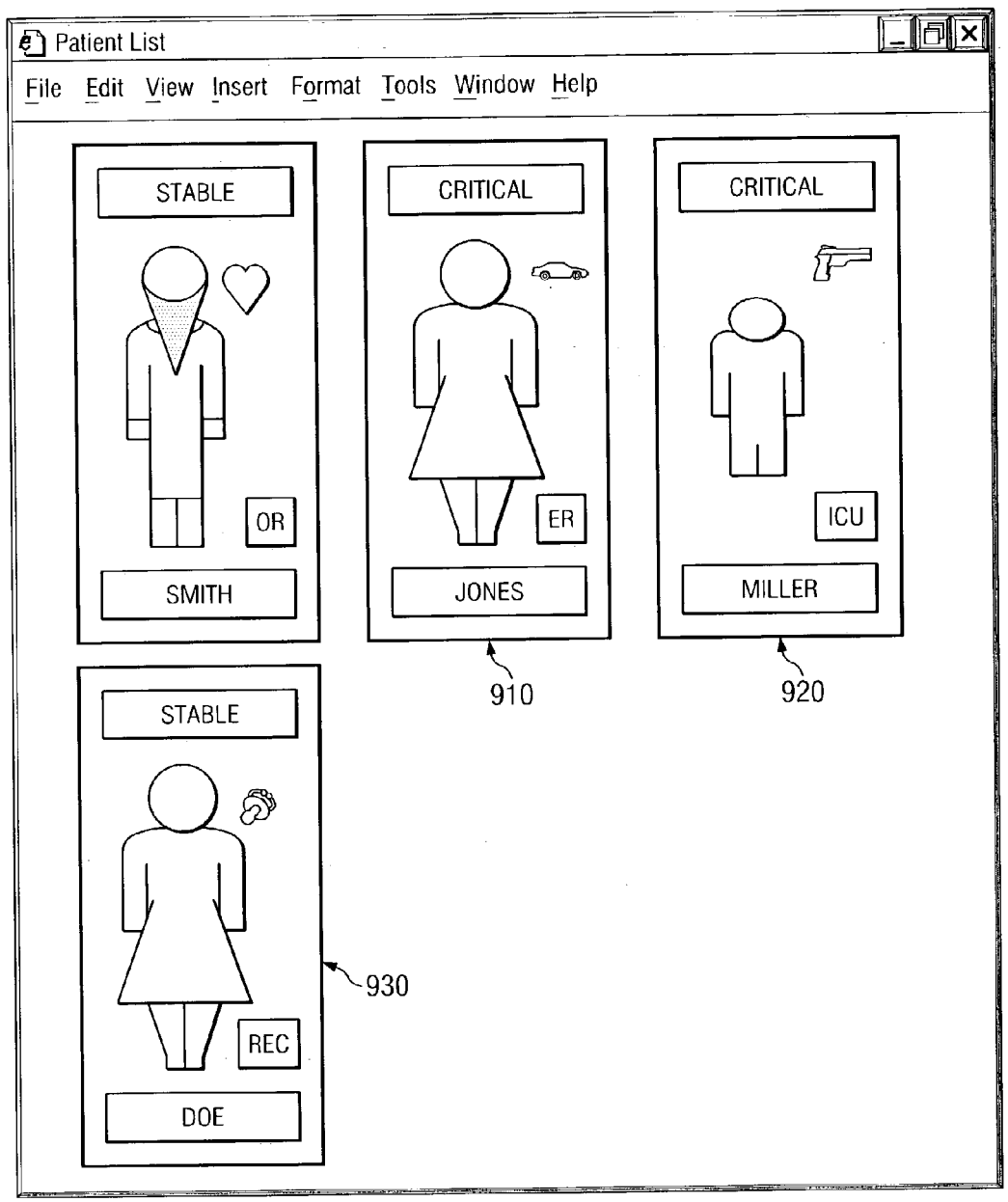
FIG. 9 is an exemplary diagram of a first graphical user interface in which composite icons according to the present invention are utilized.

FIG. 9 is an exemplary diagram of a first graphical user interface in which composite icons according to the present invention are utilized. As shown in FIG. 9, the graphical user interface depicted is for displaying a patient list. The patient list is comprised of a plurality of composite icons which include context based icon additions representing the current status of the patients. The composite icon for Mr. Smith discussed above is present in the patient list in addition to three other composite icons for other patients. These other patient composite icons include a composite icon 910 for Ms. Jones (represented by the female shaped base icon) who is in critical condition due to a car accident and is currently in the emergency room. A composite icon 920 for Mr. Miller, who is a child (represented as a smaller male base icon), is in critical condition due to a gun shot wound, and is currently in the intensive care unit (ICU), is also provided. Another composite icon 930 is illustrated that represents Ms. Doe, a female patient who is stable and is in the hospital to give birth to a child (represented by the pacifier graphic). She is currently located in a patient recovery room.

Figure 10:
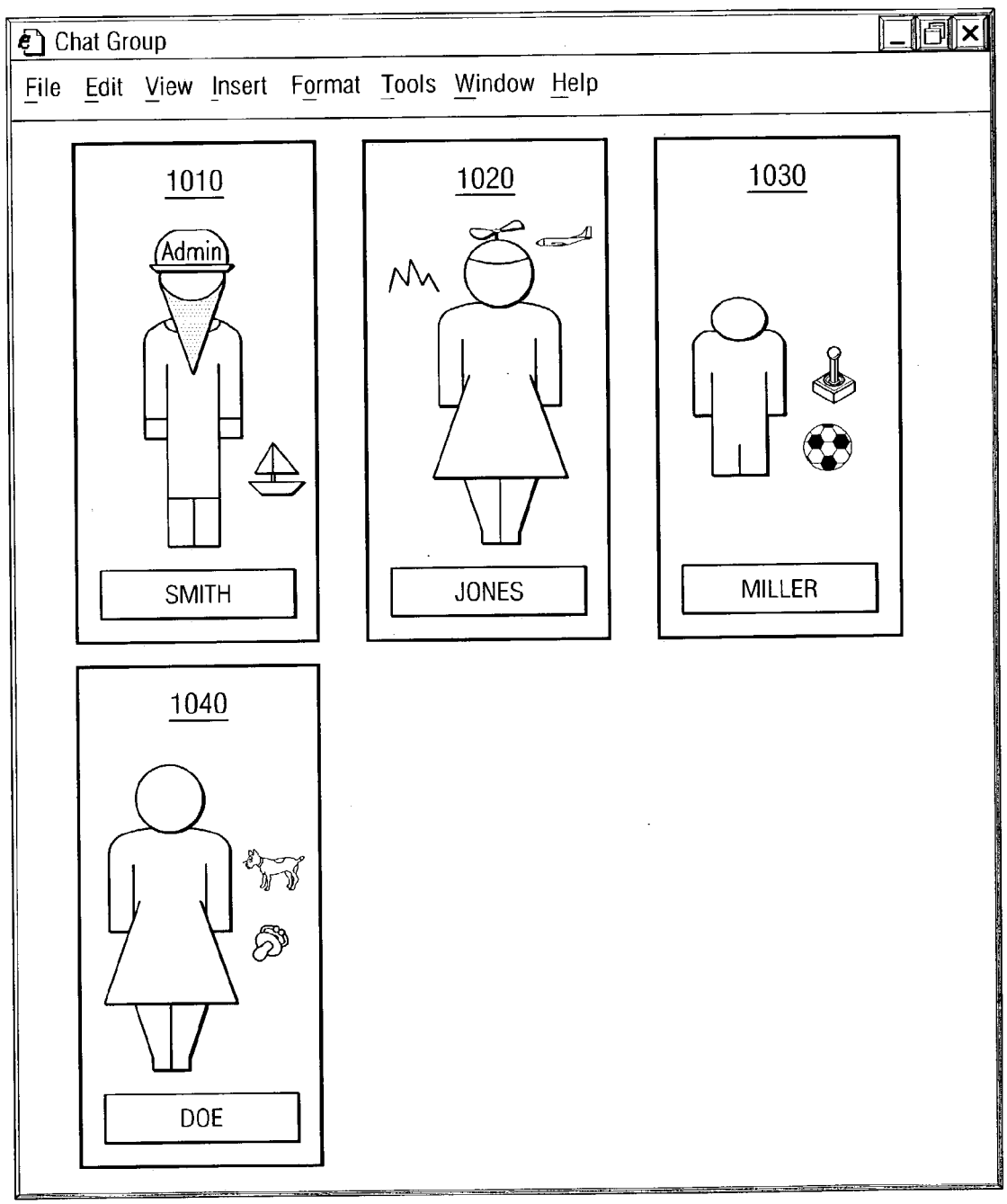
FIG. 10 is an exemplary diagram of a second graphical user interface which uses the same objects and base icons that form the basis of the composite icons in FIG. 9.

FIG. 10 is an exemplary diagram of a second graphical user interface which uses the same objects and base icons that form the basis of the composite icons in FIG. 9. FIG. 10 illustrates how the same base icons, and thus, the same objects associated with the base icons, may be used in a different context and thereby generate a different composite icon. The particular graphical user interface shown in FIG. 10 is for a chat group application.

As shown in FIG. 10, the base icon for Mr. Smith has icon additions added to it, to thereby generate composite icon 1010, that represent the fact that Mr. Smith has been a member of the chat group of quite some time, is an administrator of the chat group, and has an interest in sailing. The base icon for Ms. Jones has icon additions added to it, to thereby generate composite icon 1020, that represent that Ms. Jones is new to the chat group and has interests in hiking and canoeing. Mr. Miller's composite icon 1030, has icon additions that represent his interest in computer games and soccer. Ms. Doe has a composite icon 1040 that indicates her interests to be children and pets and that she is currently unavailable for chat.

Thus, as FIGS. 9 and 10 show, the same base icon may be used in different contexts to thereby generate a different composite icon depending on the context. As previously described, the use of events to notify the daemon process of the present invention of changes in context allows such composite icons to be generated dynamically. As a result, the present invention provides a mechanism for dynamically generating context sensitive composite icons.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for dynamically building a context sensitive composite icon for representing a data object in a graphical user interface, comprising:

identifying a base icon data structure for a data object;

identifying one or more icon addition data structures based on a context of the data object, wherein one or more context rules are associated with the context of the data object and wherein the context rules are used to identify the one or more icon addition data structures based on the context of the data object;

adding the one or more icon addition data structures to the base icon data structure to thereby generate a composite icon data structure comprised of the base icon data structure and the one or more icon addition data structures;

graphically representing the composite icon data structure in the graphical user interface on a display of the data processing system;

determining if there is a conflict between two or more icon addition data structures of the one or more icon addition data structures; and resolving the conflict based on priorities assigned to the two or more icon addition data structures.

2. The method of claim 1, wherein identifying one or more icon addition data structures based on the context of the data object includes:

identifying one or more context rules associated with the context of the data object;

applying the one or more context rules to the data object; and identifying the one or more icon addition data structures based on results of applying the one or more context rules to the data object.

3. The method of claim 1, wherein adding the one or more icon addition data structures to the base icon data structure includes:

identifying one or more addition points in the base icon data structure; and adding the one or more icon addition data structures to the base icon data structure at the one or more addition points.

4. The method of claim 3, wherein adding the one or more icon addition data structures to the base icon data structure at the one or more addition points includes using one of an icon overlay mechanism for overlaying the one or more icon addition data structures on the base icon data structure and a bit masking mechanism for inserting the icon addition data structures into the base icon data structure.

5. The method of claim 1, further comprising:

receiving an event notification indicating a change in context for the data object, wherein the steps of identifying the one or more icon addition data structures, adding the one or more icon addition data structures to the base icon, and graphically representing the composite icon data structure are performed in response to receiving the event notification.

6. The method of claim 1, further comprising:
receiving an event notification identifying the data object and an operation being performed with regard to the data object;
identifying the context of the data object based on the identification of the data object and the operation being performed with regard to the data object;
retrieving one or more context rules associated with the context of the data object; and
applying the context rules to the data object to thereby identify one or more icon addition data structures to be added to the base icon data structure.

7. The method of claim 6, wherein the context rules determine portions of data to extract from the data object for use in identifying the one or more icon addition data structures.

8. The method of claim 1, wherein the graphical user interface is part of a specific software application, and wherein the context is defined as the use of the data object with the specific software application.

9. The method of claim 1, further comprising:
reporting the conflict to a user.

10. The method of claim 1, further comprising:
resolving the conflict by selecting an alternate position for one of the two icon addition data structures.

11. A computer program product in a computer readable recordable medium for dynamically building a context sensitive composite icon for representing a data object in a graphical user interface, comprising:
first instructions for identifying a base icon data structure for a data object;
second instructions for identifying one or more icon addition data structures based on a context of the data object, wherein one or more context rules are associated with the context of the data object and wherein the context rules are used to identify the one or more icon addition data structures based on the context of the data object;
third instructions for adding the one or more icon addition data structures to the base icon data structure to thereby generate a composite icon data structure comprised of the base icon data structure and the one or more icon addition data structures;
fourth instructions for graphically representing the composite icon data structure in the graphical user interface on a display of the data processing system;
fifth instructions for determining if there is a conflict between two or more icon addition data structures of the one or more icon addition data structures; and
sixth instructions for resolving the conflict based on priorities assigned to the two or more icon addition data structures.

12. The computer program product of claim 11, wherein the second instructions for identifying one or more icon addition data structures based on the context of the data object includes:
instructions for identifying one or more context rules associated with the context of the data object;
instructions for applying the one or more context rules to the data object; and
instructions for identifying the one or more icon addition data structures based on results of applying the one or more context rules to the data object.

13. The computer program product of claim 11, wherein the third instructions for adding the one or more icon addition data structures to the base icon data structure includes:
instructions for identifying one or more addition points in the base icon data structure; and
instructions for adding the one or more icon addition data structures to the base icon data structure at the one or more addition points.

14. The computer program product of claim 13, wherein the third instructions for adding the one or more icon addition data structures to the base icon data structure at the one or more addition points include instructions for using one of an icon overlay mechanism for overlaying the one or more icon addition data structures on the base icon data structure and instructions for using a bit masking mechanism for inserting the icon addition data structures into the base icon data structure.

15. The computer program product of claim 11, further comprising:
seventh instructions for receiving an event notification indicating a change in context for the data object, wherein the second instructions for identifying the one or more icon addition data structures, third instructions for adding the one or more icon addition data structures to the base icon, and fourth instructions for graphically representing the composite icon data structure are executed in response to receiving the event notification.

16. The computer program product of claim 11, further comprising:
seventh instructions for receiving an event notification identifying the data object and an operation being performed with regard to the data object;
eighth instructions for identifying the context of the data object based on the identification of the data object and the operation being performed with regard to the data object;
ninth instructions for retrieving one or more context rules associated with the context of the data object; and
tenth instructions for applying the context rules to the data object to thereby identify one or more icon addition data structures to be added to the base icon data structure.

17. The computer program product of claim 16, wherein the context rules determine portions of data to extract from the data object for use in identifying the one or more icon addition data structures.

18. The computer program product of claim 11, wherein the graphical user interface is part of a specific software application, and wherein the context is defined as the use of the data object with the specific software application.

19. The computer program product of claim 11, further comprising:
seventh instructions for reporting the conflict to a user.

20. The computer program product of claim 11, further comprising:
seventh instructions for resolving the conflict by selecting an alternate position for one of the two icon addition data structures.

21. An apparatus for dynamically building a context sensitive composite icon for representing a data object in a graphical user interface, comprising:
means for identifying a base icon data structure for a data object;
means for identifying one or more icon addition data structures based on a context of the data object, wherein one or more context rules are associated with the context of the data object and wherein the context rules are used to identify the one or more icon addition data structures based on the context of the data object;

means for adding the one or more icon addition data structures to the base icon data structure to thereby generate a composite icon data structure comprised of the base icon data structure and the one or more icon addition data structures;

means for graphically representing the composite icon data structure in the graphical user interface on a display of the data processing system;

means for determining if there is a conflict between two or more icon addition data structures of the one or more icon addition data structures; and means for resolving the conflict based on priorities assigned to the two or more icon addition data structures.

* * * * *